United States Patent [19]

Kulhavy

[11] Patent Number: 4,547,768
[45] Date of Patent: Oct. 15, 1985

[54] TOILET RESERVOIR FILL ALARM

[76] Inventor: Karel A. Kulhavy, P.O. Box 535, Bath, S. Dak. 57427

[21] Appl. No.: 453,709

[22] Filed: Dec. 27, 1982

[51] Int. Cl.$^4$ .............................................. G08B 21/00
[52] U.S. Cl. ...................................... 340/620; 4/661;
340/530; 340/605; 340/616
[58] Field of Search .............. 340/618, 620, 616, 623, 340/624, 625, 605, 527, 530, 573; 4/661

[56] References Cited

U.S. PATENT DOCUMENTS

| | | | |
|---|---|---|---|
| 1,066,479 | 7/1913 | Fiala | 340/625 |
| 3,365,710 | 1/1968 | Duplessy | 340/605 X |
| 3,566,387 | 2/1971 | Schoener et al. | 340/530 |
| 3,781,840 | 12/1973 | Roberts et al. | 340/620 |

FOREIGN PATENT DOCUMENTS 1609195 12/1969 Fed. Rep. of Germany ...... 340/616

Primary Examiner—James L. Rowland
Assistant Examiner—Daniel Myer
Attorney, Agent, or Firm—Richard L. Miller

[57] ABSTRACT

A toilet reservoir fill alarm including water level sensors which can be positioned in the water reservoir tank of a flush toilet to detect the presence or absence of water at a desired level. A switch responds to the water level sensors and produces a control signal during the absence of a desired level. The control signal operates a timing circuit in order to produce an output signal at the termination of a predetermined time interval. Responsive to the output signal is an alarm circuit. In this manner, an alarm will sound should the toilet tank reservoir not refill during the predetermined time interval following the flushing of the toilet.

19 Claims, 4 Drawing Figures

4,547,768

TOILET RESERVOIR FILL ALARM

BACKGROUND OF THE INVENTION

This invention relates to flush toilets, and more particularly, to an alarm device for detecting whether the reservoir tank of a flush toilet has filled within a predetermined interval of time.

One type of commonly used flush toilet includes a reservoir tank in which water is stored for flushing the toilet bowl. Following flushing of the toilet bowl, the reservoir tank again refills so that it will be ready for a subsequent flushing operation. The reservoir tank usually includes a ball or plate supported on a post or chain which lowers as the water is expelled from the reservoir tank during a flushing operation and closes off the outlet port from the reservoir tank. This then permits a fresh supply of water to enter into the reservoir tank and fill the tank. A float is usually provided to shut off the flow of water into the tank when a desired level is reached.

One common problem with reservoir tanks is that the flushing lever may get stuck and as a result the ball will not lower to seat on the outlet port. At other times, the chain or post holding the ball will not seat properly on the outlet port. As a result, while water flows into the reservoir tank, the tank fails to fill since the water coming in will immediately flow out of the outlet port. As result, water continues to flow into the reservoir tank but the tank fails to fill and there is a continuous flow of water.

The continuous flow of water is a major problem in those locations where people pay for the water utilized and the water is measured by a water meter. In these locations, the continuous flow of water causes an increase in the cost of the water.

Even in those locations where water use is not charged the continuous flow of water still provides a loss for the municipality who provides the water. As a result, taxes will increase and again an increased cost results from this continuous flow. Furthermore, the continuous flow may cause annoyance to other in the area. Also, the continuous flow may cause excessive wear on various parts of the reservoir tank through which the water flows.

Normally, after the flushing operation, it takes an interval of the time until the water reservoir tank is filled. As a result, immediately after a flushing operation the fresh water flows into the reservoir tank. The user is therefore not easily able to discern whether the water flowing into the reservoir tank is actually being retained in the tank to fill it or whether it is just passing through the tank while going right out the outlet port. Usually, the user will walk away from the reservoir tank after flushing the toilet expecting that the flow of water will be filling the tank. As a result, he will not be aware that the tank is actually not filling properly and the previously mentioned losses will therefore occur.

The problem of failure to refill the reservoir tank also occurs in rural areas and small towns where septic tanks are in use. In such situations, individual household disposal is commonly accomplished by means of a septic tank and drain fields. The septic tank is usually provided in an undergroundreservoir wherein raw sewage empties, and after decay of the solids, liquid effluent surfaces to the top of the tank. The continuous addition of raw sewage to the tank causes the liquid effluent on the surface to overflow from the septic tank to the drain field. The drain field is usually made of a number of sections of perforated pipe that allow the liquid effluent to seep away into the adjacent soil. This system of sewage disposal is very effective if air is not allowed into the system and if sewage input is slow enough to allow decay of solids in the septic tank before forcing it into the drain fields.

If the reservoir tank of the toilet fails to refill and the water entering the reservoir tank after flushing continuously flows, it will flow through the bowl and then to the septic tank. If this water flow is not noticed and stopped, it will cause a reduction in bacteria concentration in the septic tank and as a result reduces the effectiveness to reduce solid waste to liquid waste. Also the continuous waste passing out of the septic tank to the drain field tends to saturate the soil with water making it ineffective in absorbing normal septic tank discharge.

Normally, as a result of this saturation with water of the septic tank and drain field, the homeowner will hire a tank truck with a suction pump to draw the water from the septic tank to the truck. The tank truck disposes of the water from the septic tank. This pumping usually does not restore this system to normal, but does allow sufficient time for regular waste to reach the overflow level in the septic tank. This gives the drain field time to partially recover from the saturated condition. Sometimes, the multiple pumpings are required in order to bring the drain field saturation to a point where it will absorb normal septic tank overflow.

Because of the uncontrolled water from the reservoir tank of the toilet to the sewage system, extra operating expense is incurred and interrupted usage of the system brings about significant inconvenience.

SUMMARY OF THE INVENTION

It is accordingly an object of the present invention to provide a device which avoids the aforementioned problems.

A further object of the present invention is to provide a device which will detect when a toilet reservoir tank is not filling and will provide an alarm.

Still another object of the present invention is to provide an alarm device which can suitably fit onto a toilet reservoir tank and will detect when the water has not filled the tank after a flushing operation.

Yet a further object of the present invention is to provide an alarm device for the reservoir tank of a flushing toilet which will detect when the water level in the tank has reached a suitable level after a flushing operation and will provide a warning signal when the level has not reached a desired level.

Still a further object of the present invention is to provide an alarm device for use with a toilet reservoir tank which will provide an alaram signal when the tank fails to refill after a predetermined interval following a flushing operation.

Briefly, in accordance with the present invention, there is provided a toilet reservoir fill alarm which includes water level sensors which can be positioned in the water reservoir tank of a flush toilet and detect the presence and absence of water at a desired level in the reservoir tank. A switch responds to the sensors and provide a control signal during the absence of a desired level of water and terminates the control signal upon the presence of the desired level of water in the tank. A timing circuit operates during the presence of the control signal and produces an output signal at the end of a predetermined time interval. An alarm circuit responds to the output signal of the timing circuit. In this manner the alarm will sound should the toilet tank reservoir not refill during the predetermined time interval following flushing of the toilet.

In an embodiment of the invention, the alarm device is formed in a portable housing with mounting brackets on the housing for mounting the housing externally of the water reservoir tank. The water level sensors are supported from the housing and retained internally of the reservoir tank so as to extend into the water contained in the tank.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

In the various figures of the drawings, like reference numerals designate like parts.

DESCRIPTION OF THE PREFERRED EMBODIMENT

Figure 1:
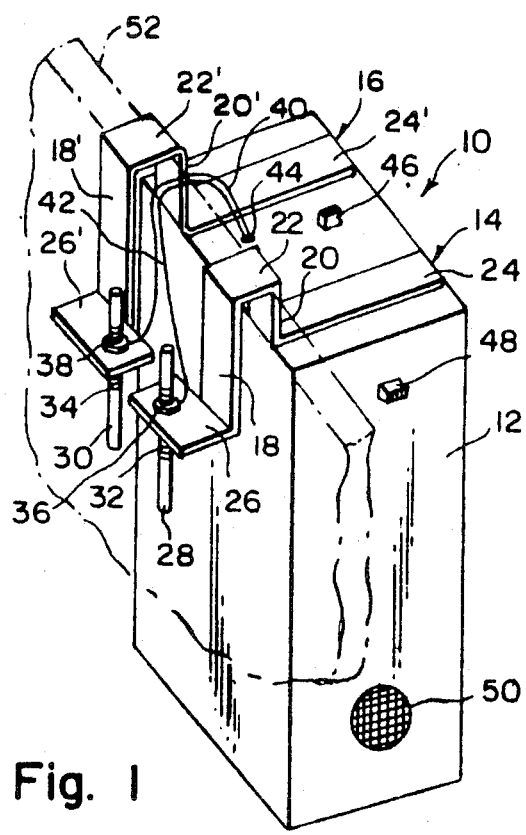
FIG. 1 is a perspective view of the alarm device in accordance with the present invention.

Referring now to FIG. 1, the alarm device of the present invention is shown generally at 10 and is located within a substantially rectangular housing 12. On the housing there are provided two mounting brackets 14, 16. Mounting bracket 14 includes a U-shaped section having a first elongated leg 18 with an opposing shorter leg 20 and an interconnecting bight portion 22. The shorter leg 20 terminates in a laterally extending horizontal foot section 24 which is fastened directly onto the top of the housing. At the distal edge of the leg 18, there is provided an inwardly extensive foot 26. For convenience, the parts of the bracket 16 are labeled with a prime which correspond to the same parts of the bracket 14.

Apertures are formed in the feet 26, 26' and electrode sensor rods 28, 30 are inserted into these apertures. Typically, the apertures are threaded and corresponding external threads 32, 34 are formed in the periphery of at least a portion of the electrode rods 28, 30 to permit them to be screwed into the apertures. The rods 28, 30 are held in place by means of nuts 36, 38 which also serve as connecting terminals for the wires 40, 42 which pass upward over the top of the tank and down through a hole 44 in the housing 12. The feet 26, 26' are formed of insulating material and the electrode rods will be of conductive material.

Also provided on the housing is an alarm switch 46 and a main power on/off switch 48. An audio alarm grill 50 is also provided through which the alarm will sound.

The housing is mounted onto the upper edge of wall 52 of the reservoir tank which is shown in dotted line. The bight portions 22, 22' of the mounting brackets sit over the top edge of the reservoir tank wall and the electrodes are positioned inside of the wall.

Installation of the unit is achieved by placing the alarm on the edge of the tank and adjusting the threaded sensor rods to approximately ½ inch below the water level with a filled reservoir. The cover on the reservoir tank is then replaced.

Figure 3:
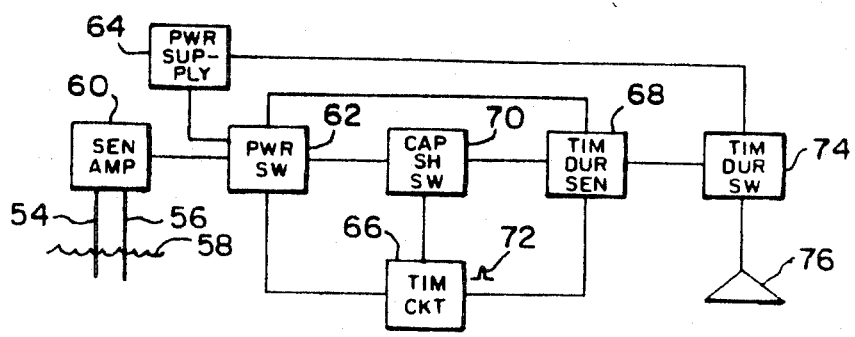
FIG. 3 is a block diagram corresponding to the detailed circuit shown in FIG. 2.

Referring now to FIG. 3, a block diagram of the present alarm circuit is described. The sensor rods 54, 56 (corresponding to rods 28, 30 of FIG. 1) are shown submerged slightly beneath water level 58 which is in a reservoir tank. When the toilet is flushed, the water level in the reservoir tank lowers. This lowering of the water allows the water sensing rods 54, 56 to be out of the water and as a result of this action a positive going signal is created at the output of the sensor amplifier 60 to which the sensors are attached. This positive signal remains at the output of the sensor amplifier 60 as long as the water sensing probes 54, 56 remain out of water.

The positive signal from the sensor amplifier is applied to an automatic power switch 62 which allows it to turn on and apply power from the battery power supply 64 to a timer circuit 66 and a timing duration sensing circuit 68. This initiates the timing action. The timer circuit as well as the timing duration sensor circuit have relatively high leakage currents and are switched off when not performing a timing operation. In this way, the battery life can be extended.

When the automatic power switch 62 turns on it applies a signal to the capacitor shorting switch 70. The capacitor shorting switch 70 removes a short circuit from a timer contained within the timing circuit 66 and thereby allows a capacitor charging action to take place at the input of the timing circuit 66. When the charge reaches a predetermined level, the timer circuit produces at its output a short duration positive pulse, shown at 72 and at the same time discharges the timer input.

The short duration pulse 72 at the output of the timing circuit 66 is sensed by the time duration sensor circuit 68. This sensing action results in the turning on of the timing duration switch 74, which can typically be a relay switch. This thereby permits the battery power supply 64 to supply suitable voltage to the alarm buzzer 76. The alarm buzzer then produces an audio sound indicating that the toilet reservoir tank did not refill in the time determined by the timed circuitry.

In order to stop the alarm, a manual on/off power switch must be placed into the off position. Restoring of the reservoir water level to its normal desired level together with the manual on/off switch returned to the on position, resets timing circuitry and places the alarm unit back into its normal operation.

If, after flushing, the toilet reservoir fills and the sensors 54, 56 are again submerged in the water before an alarm is initiated, the sensor amplifier output voltage will be removed. This will turn off the automatic power switch 62. Turning off of the automatic power switch will render the timing circuit 66 inoperative and at the same time reapply the short circuit 70 across the timing circuit input capacitor charge circuit thereby resetting it for the next timing cycle. Resetting the timer before its timing cycle is complete results in no audio alarm. The lack of any audio alarm indicates that the toilet reservoir has suitably filled within the time determined by the timing circuitry.

Figure 4:
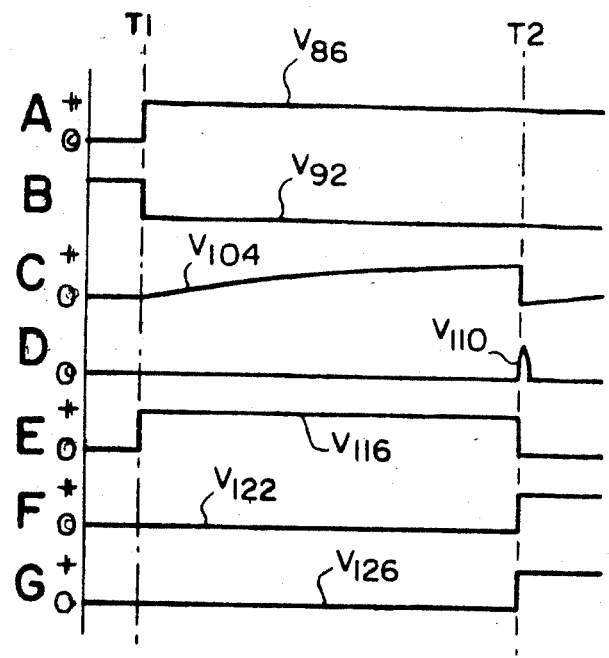
FIG. 4 is a timing diagram explaining the operation of circuit if FIG. 2.
Figure 2:
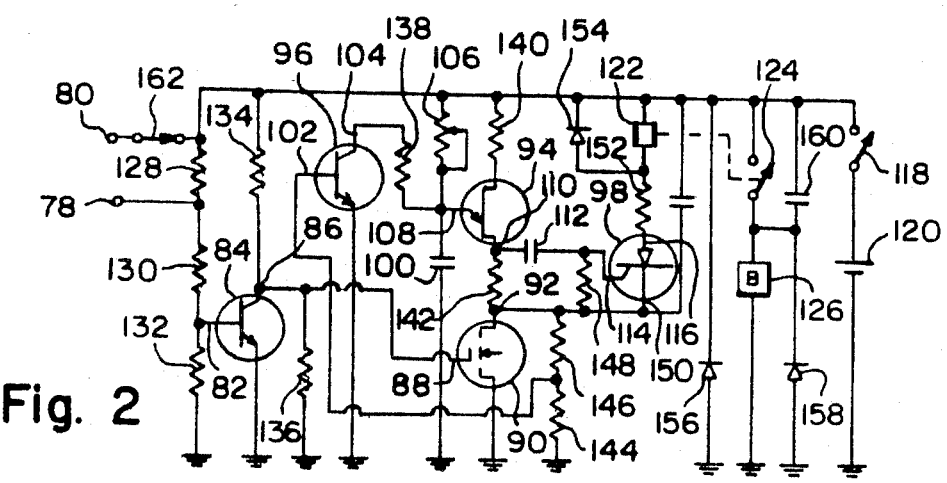
FIG. 2 is a circuit diagram of the reservoir fill alarm of the present invention.

Referring now to FIG. 2, in conjunction with FIG. 4, a suitable detailed circuit will be described together with an appropriate timing diagram. As shown in FIG. 2, when the toilet is flushed the water level of the reservoir lowers. The sensor rods 78, 80 (corresponding to rods 54, 56 of FIG. 2) will then be out of the water. As the result of this action the base 82 of the transistor 84 turns low and the transistor 84 will be turned off. The collector 86 of the transistor 84 will then go high and remains high as long as the sensor rods are out of the water. The voltage on the collector $V_{86}$ is shown in FIG. 4A. It is noted that the time T1 is when the flushing action occurs and the voltage $V_{86}$ goes high.

When the collector 86 is high, the gate voltage on the gate 88 of the MOSFET 90 (corresponding to power switch 62) will also be high. A high on the gate turns on the MOSFET 90 so as to allow its base two, shown at 92, to have a voltage which is low. This allows the unijunction transistor 94 (corresponding to the time duration sensor 68), the transistor 96 (corresponding to the capacitor shorting switch 70) and the SCR 98 (corresponding to the time duration switch 74) to perform the necessary timing function. The voltage on the base two of the MOSFET 90 is shown in 4B and is designate as the voltage $V_{92}$. The MOSFET transistor 90 is normally off in order to reduce the leakage current of the unijunction transistor 94 and the SCR 98 so as to extend the battery life.

Transistor 96 which is normally placing a short circuit across the capacitor 100 thereby turns off due to the low voltage at 92. This places a low at the base 102 of the transistor 96. This allows the collector 104 of the transistor 96 to go high as the capacitor 100 charges through the variable resistor 106. It should be noted that the values of the capacitor 100 and the resistor 106 determine the charge time of the capacitor 100 and as an end result determine at what time the audio alarm will turn on.

The voltage at the collector 104 of the transistor 96, which reflects the charges of the capacitor 100 is shown in FIG. 4C as the voltage $V_{104}$.

When the charge on the capacitor 100 is sufficient, typically occurring at the time T2, it applies a high voltage on the gate 108 of the unijunction transistor 94 turning it on. This produces a positive going pulse at the base one of the unijunction transistor 94, designated at the point 110. The output voltage is shown in FIG. 4D as the voltage $V_{110}$. At the same time, the capacitor 100 discharges through the junction between the base one and the gate of the unijunction of transistor 94, specifically between the points 108 and 110.

The positive going pulse created at the point 110, which is the base one of the unijunction transistor 94 is coupled through the capacitor 112 to the gate 114 of the SCR 98. This turns on the SCR 98 allowing its anode 116 to go low at the time T2. This is shown in FIG. 4E as the voltage $V_{116}$.

The SCR 98 will continue to remain on until the main power switch 118 is turned off and again immediately back on. This off-on action removes the battery voltage 120 from across the SCR and permits the SCR 98 to turn off thereby resetting it for another timing action.

When the SCR turns on, it allows the coil 122 of a relay to become energized. The energization voltage across the relay is shown in FIG. 4F and represents the voltage $V_{122}$. It should be appreciated that the relay remains energized so long as the SCR is on.

Energization of the relay coil 122 causes its normally open contact 124 to close thereby connecting the voltage from battery 120 across the buzzer or alarm 126 so as to energize it. The voltage is energized at T2 and as shown in FIG. 4G by the voltage $V_{126}$.

The alarm buzzer will continue to operate until the SCR 98 is turned off by opening the power switch 118 at which time the relay coil 122 is de-energized permitting the contact 124 to open and remove the battery voltage 120 from the buzzer 126.

If, after flushing, the toilet reservoir properly fills and the sensors 78, 80 are again submerged in water before an alarm is initiated the SCR will not turn on. Also, the transistor 84 will turn on allowing the MOSFET 90 to turn off. This places the power off to the unijunction transistor 94. The transistor 96 places its short circuit across the timing capacitor 100 and therefore no charge can develop across it. If the capacitor 100 cannot charge, the timing unijunction transistor 94 will not conduct and the entire timing circuit is inoperative, resulting in no alarm being produced.

In order to complete the circuit, suitable resistors are provided. Specifically, the resistor 128 interconnects the the rods and resistors 130, 132 provide a suitable voltage divider for providing the necessary voltage for the transistor 84. The resistors 134 and 136 represent the necessary resistors for proper biasing of the transistor 84.

The resistor 138 couples the collector 104 to the gate 108. The biasing resistors 140 and 142 provide the necessary voltage needed to operate the unijunction transistor 94 and the MOSFET 90. Proper biasing for the base 102 is provided with the voltage dividing resistors 144, 146. Also resistor 148 biases the gate 114 with respect to the cathode 150 of the SCR 98. The anode resistor 152 is connected between the SCR and the coil 122 and the proper flow of current through the coil is insured by means of the diode 154. Proper diodes 156, 158 are also provided across the entire circuit with the diode 158 being in parallel with the capacitor 160 providing filtering for the switch 124.

When the sensor rods are touching the water in the reservoir, the source of power is effectively switched off. This allows for long battery life of approximately one year. Typically, six flashlight batteries can be utilized to power the entire circuit. The timer can be preset but is typically approximately two minutes. By adjusting the tap on the resistor 106, the proper timing can be obtained.

It should be noted that the alarm does not include any moving parts and all of the circuits can be retained on a printed circuit card which can be mounted in their housing shown in FIG. 1.

A periodic operational test can be made by placing the test switch 46 shown in FIG. 1 into its test position, the preset time set on the timer is waited and after hearing the alarm, the switch is then returned to its normal position in order to silence the alarm. The slide switch 162, as shown in FIG. 2, can be included in order to provide an interconnection between the rods and the rest of the circuit.

While certain novel features of this invention have been shown and described and are pointed out in the annexed claims, it will be understood that various omissions, substitutions and changes in the forms and details of the device illustrated and in its operation can be made

What is claimed is:

1. A toilet reservoir fill alarm system comprising: electronic water level sensing rods for positioning in the water reservoir tank of a flush toilet so as to at least partially extend into the water when at a desired level, and detecting the presence and absence of water at said desired level in the reservoir tank;

level adjusting means for adjusting the depth of extension of said sensing rods into the water tank so as to adjust said desired level;

switch means responsive to the water level sensors for providing a control signal during the absence of a desired level of water and terminating said control signal upon the presence of a desired water level;

capacitor timing means operative for charging up during the presence of said control signal and triggering a switch means after a predetermined time, the switch means producing an output signal at the termination of said predetermined time interval;

alarm means responsive to said output signal whereby said alarm means will sound should a toilet tank reservoir not refill during the predetermined time interval following flushing of the toilet; and short circuit means for shorting out said capacitor timing means upon termination of said control signal prior to said predetermined time interval, whereby said alarm system is immediately available for further monitoring usage.

2. A toilet reservoir fill alarm system as in claim 1 and comprising retention means for maintaining said alarm sounding once sounding has begun, even after refilling of the toilet tank, and energization switch means for manually stopping the sounding of said alarm means.

3. A toilet reservoir fill alarm system as in claim 1 and comprising sensor amplifier means coupled to said sensing rods for providing a signal to said switch means corresponding to the water level detected by said sensing rods, said sensor amplifier means turning off said switch means, said capacitor timing means and said short circuit means when said sensing rods detect the presence of water at the desired level, to thereby eliminate the need of power to said last three mentioned means during monitoring of the toilet tank.

4. A toilet reservoir fill alarm as in claim 1, wherein said timing means comprises a pulse circuit for producing said output signal, a charging circuit coupled to said pulse circuit after said predetermined time interval, and a shorting circuit coupled across said charging circuit and operated by the presence of said control signal, whereby the presence of said control signal removes the shorting circuit from the charging circuit permitting it to trigger the pulse circuit after the predetermined time interval, and the termination of said control signal places the shorting circuit across the charging circuit to thereby discharge it and automatically reset the predetermined time interval.

5. A toilet reservoir fill alarm as in claim 4, and comprising adjustment means coupled to said charging circuit for adjusting said predetermined time interval.

6. A toilet reservoir fill alarm as in claim 4, wherein said charging circuit comprises a capacitor in series with a variable resistor, said pulse circuit comprise a triggerable transistor controlled by voltage across the capacitor, and said shorting circuit comprises a transistor circuit whose output is connected across the capacitor voltage.

7. A toilet reservoir fill alarm as in claim 1, and comprising control switch means triggered by said output signal and providing continuous output, and relay switch means energized by said continuous output for sounding said alarm means.

8. A toilet reservoir fill alarm as in claim 7, wherein said control switch means comprises a thyrister device.

9. A toilet reservoir fill alarm as in claim 1, comprising housing means for containing said switch means, said timing means and said alarm means, support means for retaining said sensors externally of said housing means, and mounting means for mounting said housing means externally of the reservoir tank with the sensors retained internally of the reservoir tank so as to extend into the water in the reservoir tank.

10. A toilet reservoir fill alarm as in claim 9, and comprising a battery compartment within said housing, and circuit means for coupling batteries contained in said compartment to energize the alarm.

11. A toilet reservoir fill alarm as in claim 10, and further comprising power switch means interconnected in said circuit means for electrically connecting to the batteries, and alarm test switch means for manually testing the alarm means.

12. A toilet reservoir fill alarm, comprising: a portable housing;

mounting brackets on said housing for mounting said housing externally of the water reservoir tank of the flush toilet;

electronic water level sensors for detecting the presence and absence of water at a desired level in said reservoir tank;

support means for adjustably supporting said sensors from said housing and retaining them internally of the reservoir tank so as to extend into the water contained in the tank; and circuit means contained in said housing and coupled to said sensors and comprising timing means for timing a predetermined time interval after said sensors detect the absence of water at the desired level, alarm means for providing an alarm signal after said predetermined time interval, means for continuously sounding said alarm means even after refilling of the tank, and manual reset means for resetting said alarm means.

13. A toilet reservoir fill alarm as in claim 12, wherein said mounting brackets comprise an inverted U-shaped member having opposing legs with an interconnecting bight portion, said bight portion fitting over the upper edge of a reservoir tank wall with said legs straddling the reservoir tank wall, said housing being coupled to the legs which extend externally of the reservoir tank wall.

14. A toilet reservoir fill alarm as in claim 13, wherein said support means comprises feet portions laterally extending from the ends of the legs which are internal of the reservoir tank wall, threaded apertures formed in said feet portions, and wherein said sensors comprise cylindrical rods having at least a portion thereof externally threaded, whereby said rods can be vertically adjusted by screwing them within said apertures.

15. A toilet reservoir fill alarm as in claim 14, wherein said feet portions are of insulating material, said rods are of conductive material, and comprising wire means coupled to said rods and extending into the housing by passing over the upper edge of the reservoir tank wall.

16. A toilet reservoir fill alarm as in claim 12, and comprising a battery compartment in said housing.

17. A toilet reservoir fill alarm as in claim 16 and comprising externally manipulatable power switch means on said housing for electrically connecting a battery stored in said compartment to said circuit means, and externally manipulatable alarm test switch means on said housing for manually testing the alarm.

18. A toilet reservoir fill alarm as in claim 12, wherein said circuit means comprises switch means responsive to the water level sensors for providing a control signal during the absence of a desired level of water and terminating said control signal upon the presence of a desired water level; timing means operative during the presence of said control signal and producing an output signal at the termination of a predetermined time interval, and alarm means responsive to said output signal, whereby said alarm will sound should a toilet tank reservoir not refill during the predetermined time interval following flushing of the toilet.

19. A toilet reservoir fill alarm as in claim 18, wherein said timing means comprises a pulse circuit for producing said output signal, a charging circuit coupled to said pulse circuit for triggering said pulse circuit after said predetermined time interval, and a shorting circuit coupled across said charging circuit and operated by the presence of said control signal whereby the presence of said control signal removes the shorting circuit from the charging circuit and operated by the presence of said control signal, whereby the presence of said control signal removes the shorting circuit from the charging circuit permitting it to trigger the pulse circuit after the predetermined time interval, and the termination of said control signal places the shorting circuit across the charging circuit to thereby discharge it and automatically reset the predetermined time interval.

* * * * *